(12) United States Patent
Nakamura

(10) Patent No.: US 12,050,387 B2
(45) Date of Patent: Jul. 30, 2024

(54) LIQUID CRYSTAL DISPLAY DEVICE

(71) Applicant: TOPPAN INC., Tokyo (JP)

(72) Inventor: Yayoi Nakamura, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/958,680

(22) Filed: Oct. 3, 2022

(65) Prior Publication Data

US 2023/0027614 A1    Jan. 26, 2023

Related U.S. Application Data

(63) Continuation of application No. PCT/JP2021/014612, filed on Apr. 6, 2021.

(30) Foreign Application Priority Data

Apr. 6, 2020   (JP) ................................. 2020-068025

(51) Int. Cl.
  *G02F 1/1362* (2006.01)
  *G02F 1/1333* (2006.01)
  *G02F 1/1343* (2006.01)

(52) U.S. Cl.
  CPC .. *G02F 1/136209* (2013.01); *G02F 1/133345* (2013.01); *G02F 1/134309* (2013.01); *G02F 1/13439* (2013.01)

(58) Field of Classification Search
  CPC ......... G02F 1/136209; G02F 1/133345; G02F 1/134309; G02F 1/13439; G02F 1/1368
  See application file for complete search history.

(56) References Cited

U.S. PATENT DOCUMENTS 9,389,470 B1 * 7/2016 Tien .................. G02F 1/136209
10,345,584 B2   7/2019 Yokota et al.
(Continued)

FOREIGN PATENT DOCUMENTS

JP    2015-187695 A    10/2015
JP    2016-212292 A    12/2016
(Continued)

OTHER PUBLICATIONS

International Search Report (Form PCT/ISA/210); mailed Jun. 29, 2021 in corresponding PCT Application No. PCT/JP2021/014612 (3 pages) (3 pages English Translation).
(Continued)

*Primary Examiner* — Donald L Raleigh
(74) *Attorney, Agent, or Firm* — STAAS & HALSEY LLP

(57) ABSTRACT

A liquid crystal display device includes: a liquid crystal layer sandwiched between a first substrate and a second substrate; a first light shielding layer that is provided on the first substrate; a first insulating layer provided on the first light shielding layer; a gate electrode that is provided on the first insulating layer; a second insulating layer provided on the gate electrode; a semiconductor layer that is provided on the second insulating layer, and is provided for each pixel; a source electrode and a drain electrode that partially overlap with the semiconductor layer; a pixel electrode that is provided on the second insulating layer; a third insulating layer provided on the semiconductor layer and the pixel electrode; and a common electrode that is provided on the third insulating layer, and includes a slit.

11 Claims, 14 Drawing Sheets

(56) References Cited

U.S. PATENT DOCUMENTS

| | | | |
|---|---|---|---|
| 2014/0008656 A1 | 1/2014 | Shim et al. | |
| 2018/0067311 A1 | 3/2018 | Yokota et al. | |
| 2018/0210252 A1* | 7/2018 | Tanaka | G02F 1/1368 |
| 2019/0006395 A1 | 1/2019 | Wei et al. | |
| 2019/0074298 A1* | 3/2019 | Toda | G09G 3/3266 |
| 2019/0331972 A1* | 10/2019 | Nimura | H01L 29/78633 |
| 2020/0050063 A1* | 2/2020 | Yoshida | G02F 1/134336 |

FOREIGN PATENT DOCUMENTS

| | | |
|---|---|---|
| JP | 2018-116228 A | 7/2018 |
| JP | 2019-047026 A | 3/2019 |
| JP | 2019-191354 A | 10/2019 |
| WO | WO 2018/043472 A1 | 3/2018 |
| WO | WO 2019/061813 A1 | 4/2019 |

OTHER PUBLICATIONS

Written Opinion (Form PCT/ISA/237); mailed Jun. 29, 2021 in corresponding PCT Application No. PCT/JP2021/014612 (4 pages).

Written Opinion (Form PCT/ISA/237); mailed Jun. 29, 2021 in corresponding PCT Application No. PCT/JP2021/014612 (4 pages) (4 pages English Translation).

Notification of Transmittal of Translation of the International Preliminary Report on Patentability (Form PCT/IB/338); mailed Oct. 20, 2022 in corresponding PCT Application No. PCT/JP2021/014612 (1 page).

International Preliminary Report on Patentability (Form PCT/IB/373); mailed Oct. 6, 2022 in corresponding PCT Application No. PCT/JP2021/014612 (1 page).

Chinese Office Action issued in Chinese Application No. 202180024497.9 dated Jun. 8, 2023.

* cited by examiner

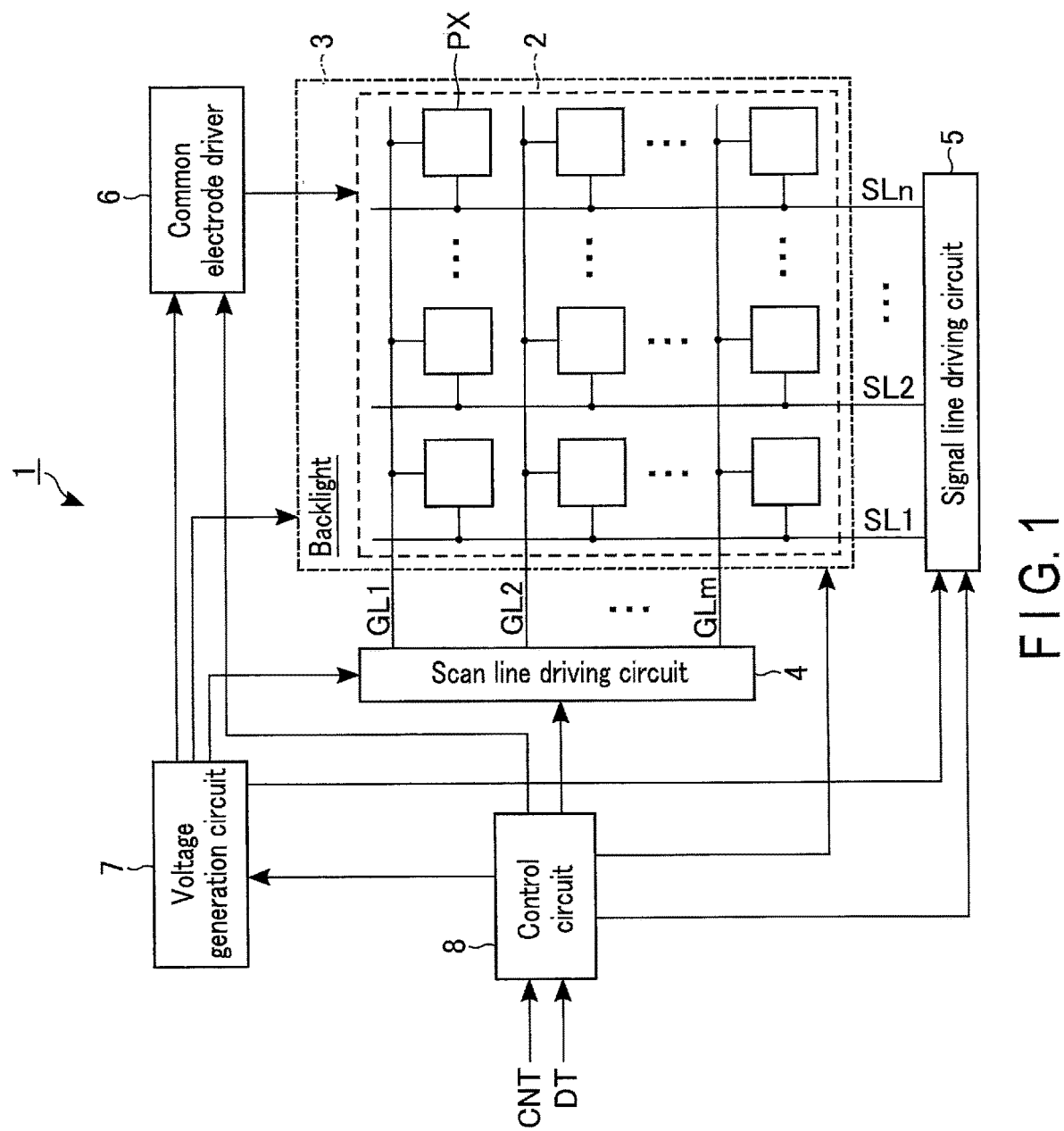
F I G. 1

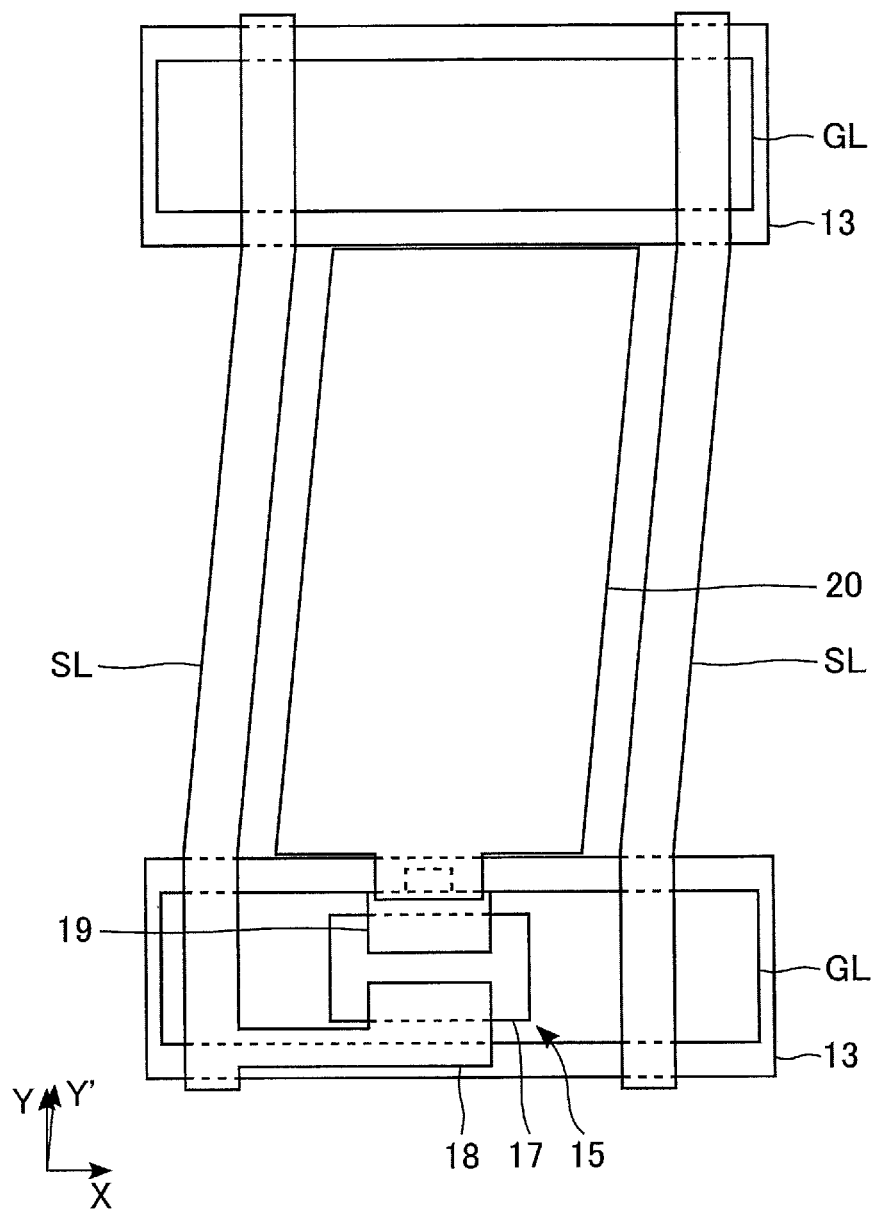
F I G. 3

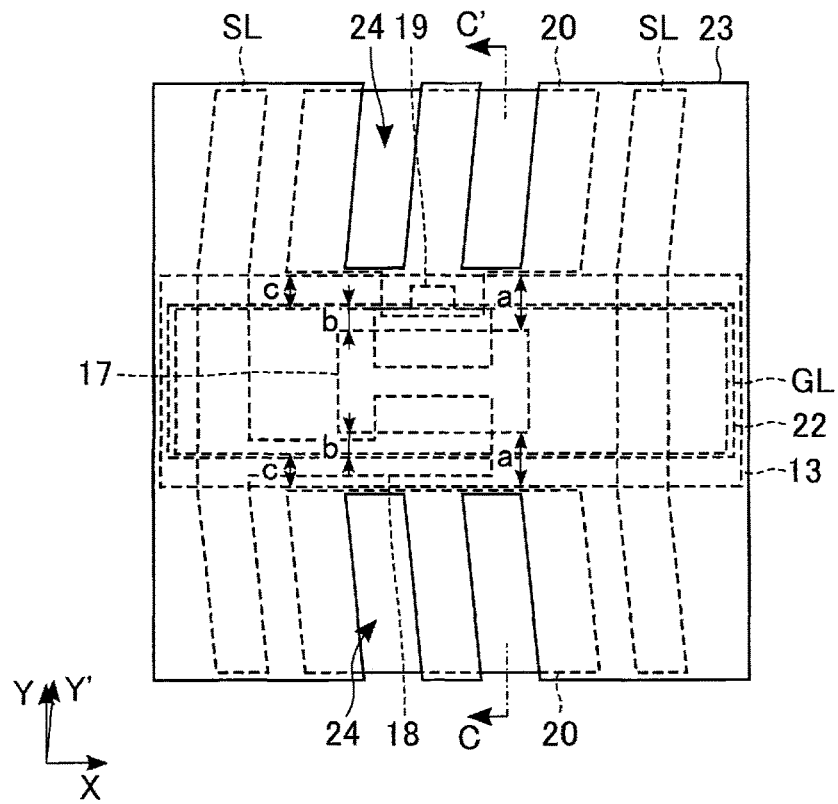
F I G. 7
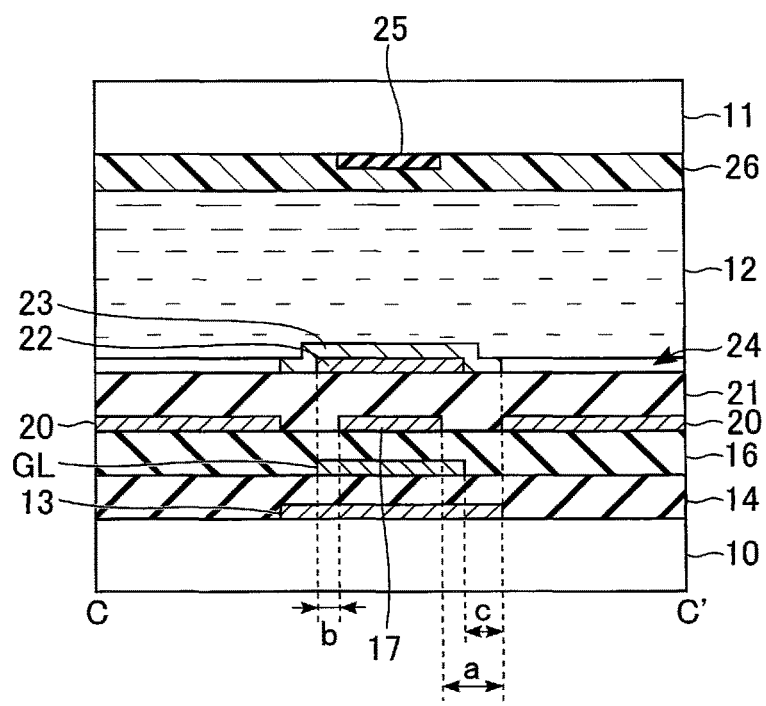
F I G. 8

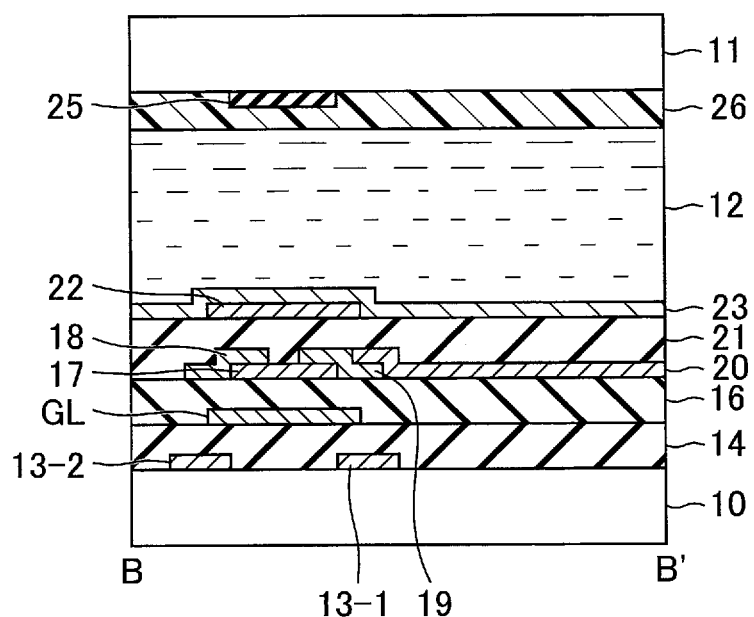
F I G. 13

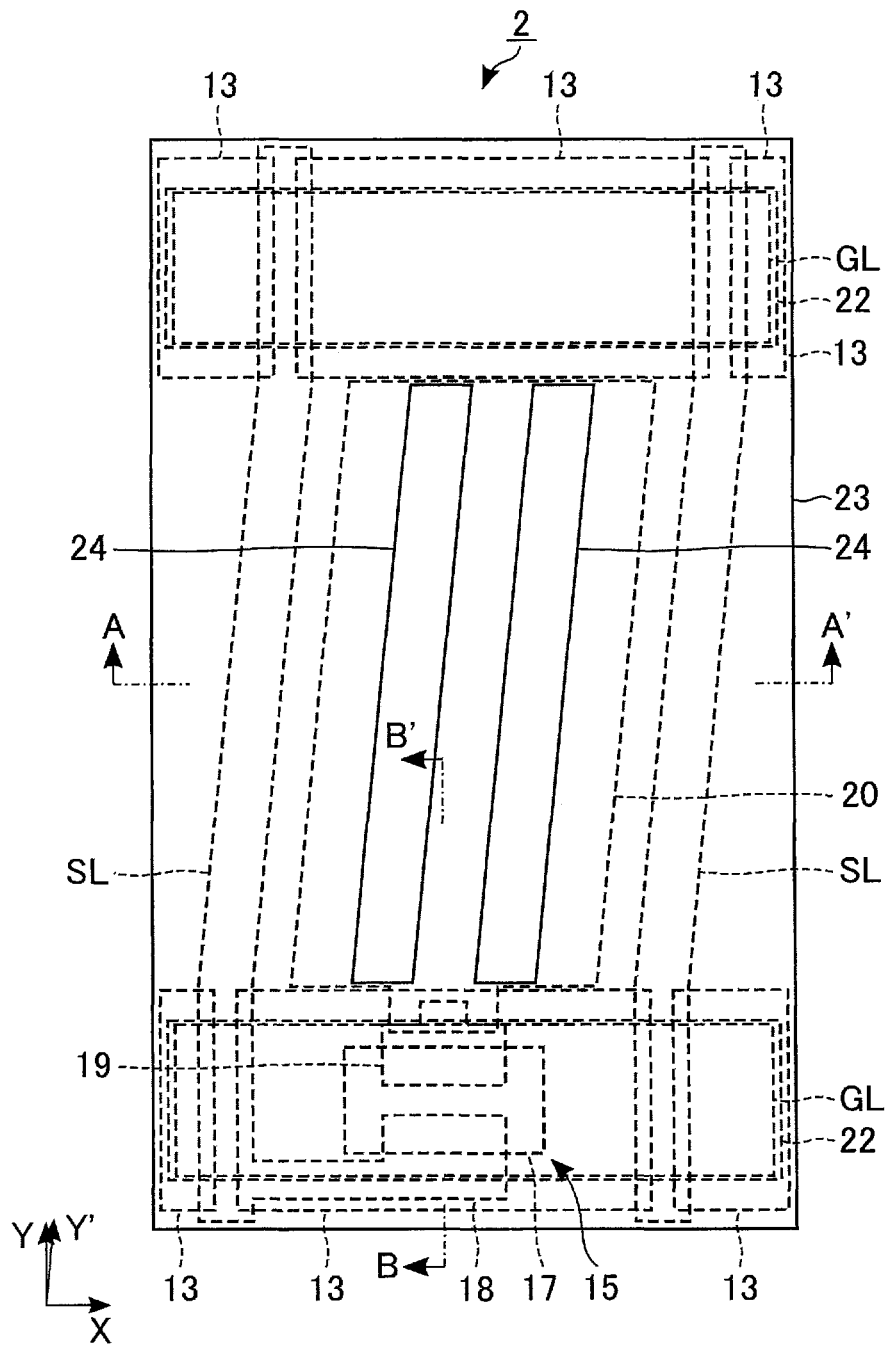
F I G. 14

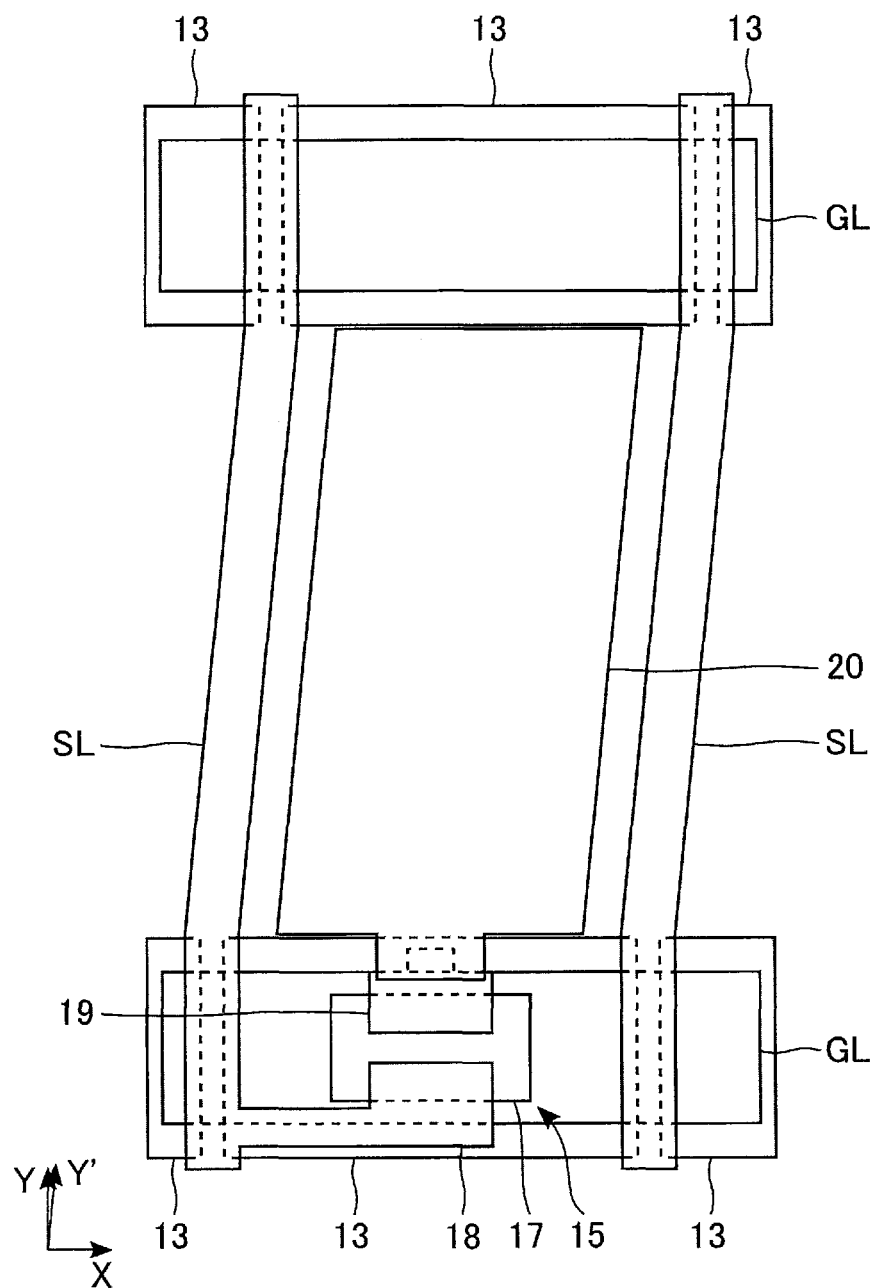
F I G. 15

LIQUID CRYSTAL DISPLAY DEVICE

CROSS-REFERENCE TO RELATED APPLICATIONS

This application is a Continuation Application of PCT Application No. PCT/JP2021/014612, filed Apr. 6, 2021, and based upon and claiming the benefit of priority from Japanese Patent Application No. 2020-068025, filed Apr. 6, 2020, the entire contents of all of which are incorporated herein by reference.

FIELD

The present invention relates to a liquid crystal display device.

BACKGROUND

The demand for compact and high-definition liquid crystal display devices, such as smart phones and tablet terminals, is increasing. In order to achieve a compact and high-definition liquid crystal display device, the reduction of pixel size is required. When the pixel size is reduced, the aperture ratio of pixel is decreased. In connection with that, in order to ensure the intensity of the liquid crystal display device, high brightness of a backlight is required.

Additionally, a head-up display (HUD) utilizes a magnifying optical system, and reflects the light emitted from the liquid crystal display device by a front window to display information. Therefore, in the head-up display, a very high-brightness backlight is required compared with a direct-viewing type display.

When using such a high-brightness backlight, a leakage current occurs in a TFT included in a pixel, and the characteristics of the liquid crystal display device is deteriorated. Therefore, a TFT design for ensuring light resistance is required.

SUMMARY

According to a first aspect of the present invention, there is provided a liquid crystal display device comprising:
a first substrate and a second substrate;
a liquid crystal layer sandwiched between the first substrate and the second substrate;
a first light shielding layer that is provided on the first substrate, and extends in a first direction;
a first insulating layer provided on the first light shielding layer;
a gate electrode that is provided on the first insulating layer, and extends in the first direction;
a second insulating layer provided on the gate electrode;
a semiconductor layer that is provided on the second insulating layer, and is provided for each pixel;
a source electrode and a drain electrode that are provided apart from each other in a second direction that intersects the first direction, so as to partially overlap with the semiconductor layer;
a pixel electrode that is provided on the second insulating layer, electrically connected to the drain electrode, and extends in the second direction;
a third insulating layer provided on the semiconductor layer and the pixel electrode; and
a common electrode that is provided on the third insulating layer, and includes a slit that extends in the second direction.

According to a second aspect of the present invention, there is provided the liquid crystal display device according to the first aspect,
wherein, in the second direction, a length of the first light shielding layer is longer than a length of the gate electrode.

According to a third aspect of the present invention, there is provided the liquid crystal display device according to the first aspect,
wherein, in the second direction, a length of the gate electrode is longer than a length of the semiconductor layer.

According to a fourth aspect of the present invention, there is provided the liquid crystal display device according to the first aspect, further comprising:
a second light shielding layer that is provided between the third insulating layer and the common electrode, and extends in the first direction.

According to a fifth aspect of the present invention, there is provided the liquid crystal display device according to the fourth aspect,
wherein, in the second direction, a length of the second light shielding layer is equal to or greater than a length of the semiconductor layer.

According to a sixth aspect of the present invention, there is provided the liquid crystal display device according to the first aspect,
wherein the common electrode is arranged so as to cover the gate electrode.

According to a seventh aspect of the present invention, there is provided the liquid crystal display device according to the first aspect,
wherein the pixel electrode is arranged so as not to overlap with the gate electrode.

According to an eighth aspect of the present invention, there is provided the liquid crystal display device according to the first aspect,
wherein the same voltage as a common voltage applied to the common electrode is applied to the first light shielding layer.

According to a ninth aspect of the present invention, there is provided the liquid crystal display device according to the first aspect,
wherein the first light shielding layer is made floating.

According to a tenth aspect of the present invention, there is provided the liquid crystal display device according to the fourth aspect, further comprising:
a third light shielding layer that is provided on the second substrate, and is provided above the semiconductor layer,
wherein, in the second direction, a length of the third light shielding layer is shorter than a length of the second light shielding layer.

According to an eleventh aspect of the present invention, there is provided the liquid crystal display device according to the first aspect,
wherein the first light shielding layer is formed by a first portion and a second portion that each extend in the first direction, and are adjacent to each other in the second direction, and
in the second direction, the first portion is arranged so as to overlap with one end of the gate electrode, and the second portion is arranged so as to overlap with the other end of the gate electrode.

According to a twelfth aspect of the present invention, there is provided the liquid crystal display device according to the first aspect, comprising:

a first pixel and a second pixel that are adjacent to each other in the first direction,
wherein the first light shielding layer is divided by the first pixel and the second pixel.

BRIEF DESCRIPTION OF THE DRAWINGS

FIG. 1 is a block diagram of a liquid crystal display device according to a first embodiment.

FIG. 3 is a plan view for describing the configuration of the liquid crystal display panel below a second light shielding layer and a common electrode.

FIG. 7 is a plan view of a part of a pixel, showing a semiconductor layer in the center.

FIG. 8 is a cross-sectional view of a part of a pixel taken along line C-C' of FIG. 7.

FIG. 13 is a cross-sectional view of the liquid crystal display panel taken along line B-B' of FIG. 11.

FIG. 14 is a plan view of a liquid crystal display panel according to a third embodiment.

FIG. 15 is a plan view for describing the configuration of the liquid crystal display panel below a second light shielding layer and a common electrode.

DETAILED DESCRIPTION

Figure 2:
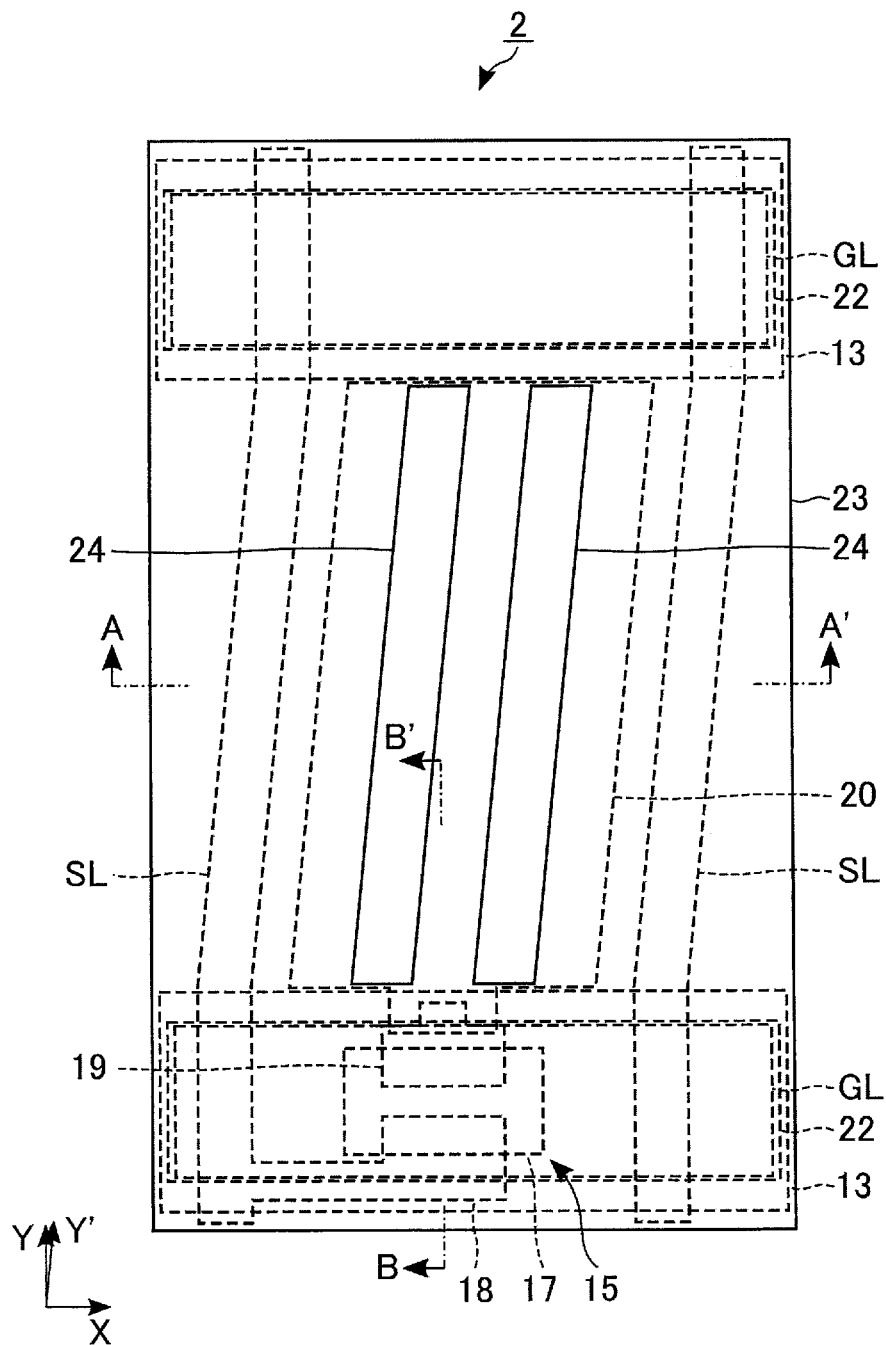
FIG. 2 is a plan view of a liquid crystal display panel according to the first embodiment.

Embodiments will be described below with reference to the drawings. However, the drawings are schematic or conceptual, and the dimension, ratio, and the like in each of the drawings is not necessarily the same as the actual ones. Additionally, even when the same portion is represented in different drawings, the dimension and proportion may be represented to be different from each other. Especially, some embodiments shown below exemplify a device and a method for embodying the technical concept of the present invention, and the technical concept of the present invention is not specified by the shape, configuration, arrangement, and the like of components. Note that, in the following descriptions, elements having the same functions and configurations are denoted by the same numerals, and redundant descriptions are omitted.

[1] First Embodiment

[1-1] Overall Configuration of Liquid Crystal Display Device

A liquid crystal display device according to the present embodiment is a liquid crystal display device of the FFS (fringe field switching) system. The FFS system is a system in which homogeneously aligned liquid crystal is switched by a fringe electric field.

FIG. 1 is a block diagram of a liquid crystal display device 1 according to a first embodiment. The liquid crystal display device 1 includes a liquid crystal display panel 2, a backlight (illumination device) 3, a scan line driving circuit 4, a signal line driving circuit 5, a common electrode driver 6, a voltage generation circuit 7, and a control circuit 8.

The liquid crystal display panel 2 includes a pixel array in which a plurality of pixels PX are arranged in a matrix. A plurality of scan lines GL1 to GLm each extending in a row direction, and a plurality of signal lines SL1 to SLn each extending in a column direction are disposed in the liquid crystal display panel 2. "m" and "n" are integers equal to or greater than 2, respectively. Pixels PX are arranged in intersection areas between the scan lines GL and the signal lines SL.

The backlight 3 is a surface light source that irradiates a back surface of the liquid crystal display panel 2 with light. As the backlight 3, for example, a direct type or a side light type (edge light type) LED backlight is used.

The scan line driving circuit 4 is electrically connected to the scan lines GL. Based on a control signal sent from the control circuit 8, the scan line driving circuit 4 sends a scan signal to the liquid crystal display panel 2 to turn on/off the switching elements included in the pixels PX.

The signal line driving circuit 5 is electrically connected to the signal lines SL. The signal line driving circuit 5 receives the control signal and display data from the control circuit 8. Based on the control signal, the signal line driving circuit 5 sends gradation signals (drive voltages) corresponding to the display data to the liquid crystal display panel 2.

The common electrode driver 6 generates a common voltage Vcom, and applies it to a common electrode in the liquid crystal display panel 2. The voltage generation circuit 7 generates various voltages necessary for the operation of the liquid crystal display device 1 and applies them to the respective circuits.

The control circuit 8 collectively controls the operation of the liquid crystal display device 1. The control circuit 8 externally receives image data DT and a control signal CNT. Based on the image data DT, the control circuit 8 generates various control signals, and sends these control signals to the corresponding circuits.

[1-2] Configuration of Liquid Crystal Display Panel 2

Figure 4:
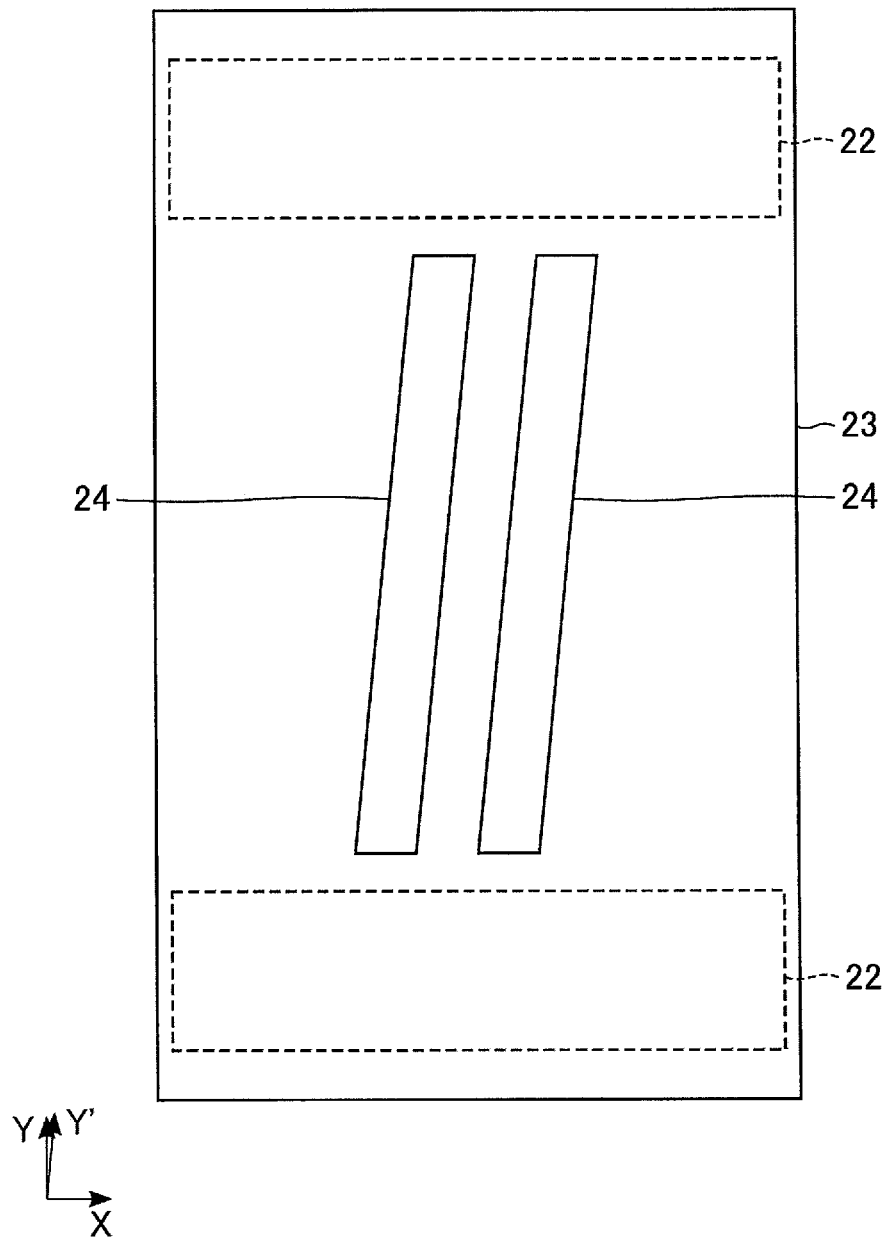
FIG. 4 is a plan view of the second light shielding layer and the common electrode that are extracted.
Figure 5:
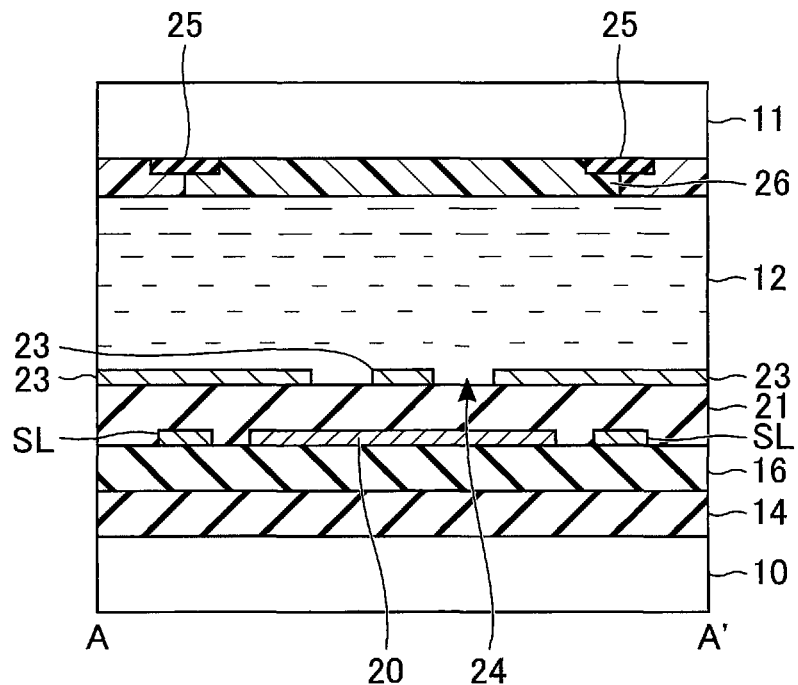
FIG. 5 is a cross-sectional view of the liquid crystal display panel taken along line A-A' of FIG. 2.
Figure 6:
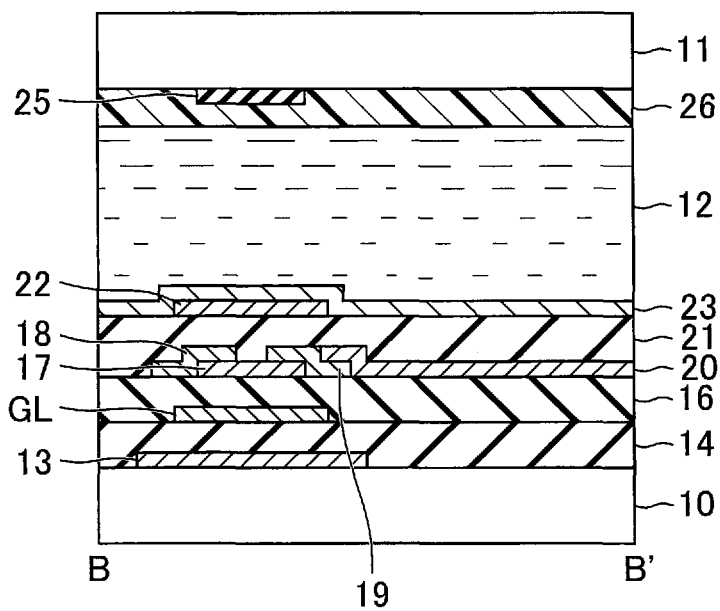
FIG. 6 is a cross-sectional view of the liquid crystal display panel taken along line B-B' of FIG. 2.

FIG. 2 is a plan view of the liquid crystal display panel 2 according to the first embodiment. FIG. 3 is a plan view for describing the configuration of the liquid crystal display panel 2 below a second light shielding layer 22 and a common electrode 23. FIG. 4 is a plan view of the second light shielding layer 22 and the common electrode 23 that are extracted. FIG. 5 is a cross-sectional view of the liquid crystal display panel 2 taken along line A-A' of FIG. 2. FIG. 6 is a cross-sectional view of the liquid crystal display panel 2 taken along line B-B' of FIG. 2. In FIG. 2, an X direction is a direction in which a gate electrode extends, a Y direction is a direction orthogonal to the X direction, and a Y' direction is an oblique direction inclined 5 to 10 degrees to the Y direction. In FIG. 2, a portion corresponding to one pixel is extracted and shown, and actually, a plurality of pixels of FIG. 2 are arranged in a matrix.

The liquid crystal display panel 2 includes a TFT substrate 10 on which a switching element (TFT), a pixel electrode and the like are formed, and a color filter substrate (CF substrate) 11 on which a color filter and the like are formed. The CF substrate 11 is arranged to oppose to the TFT substrate 10. Each of the TFT substrate 10 and the CF substrate 11 is configured by a transparent and insulating substrate (for example, a glass substrate, or a plastic substrate).

A liquid crystal layer 12 is sandwiched and filled between the TFT substrate 10 and the CF substrate 11. Specifically, the liquid crystal layer 12 is sealed in a display area surrounded by the TFT substrate 10, the CF substrates 11, and a sealing member (not shown). The sealing member is made of, for example, an ultraviolet-curing resin, a thermosetting resin, an ultraviolet-heat combination-type curing resin, or the like, and is applied to the TFT substrate 10 or the CF substrate 11 in a manufacturing process, and then cured by ultraviolet irradiation, heating, or the like.

The liquid crystal materials composing the liquid crystal layer 12 vary in optical characteristics as the alignment of liquid crystal molecules is manipulated in accordance with an applied electric field. In the present embodiment, a positive (P-type) nematic liquid crystal having positive dielectric anisotropy is used as the liquid crystal layer 12. The liquid crystal layer 12 is horizontally aligned (homogeneous alignment) in an initial state. When there is no voltage (no electric field), the liquid crystal molecules are aligned substantially horizontally with respect to the main surface of the substrate. When a voltage (electric field) is applied, the director of the liquid crystal molecules tilt toward the direction of the electric field.

First, the configuration of the TFT substrate 10 side will be described. A first light shielding layer 13 is provided on the liquid crystal layer 12 side of the TFT substrate 10. The first light shielding layer 13 has a function of shielding a semiconductor layer included in the switching element from light. The first light shielding layer 13 extends in the X direction. For example, the first light shielding layer 13 is provided in common for a plurality of pixels for one row arranged in the X direction. An insulating layer 14 is provided on the TFT substrate 10 and the first light shielding layer 13.

A switching element 15 is provided on the insulating layer 14 for each pixel. As the switching element 15, for example, a TFT (thin film transistor) is used, and an n-channel TFT is also used. As will be described later, the TFT 15 includes a gate electrode functioning as a scan line, a gate insulating film provided on the gate electrode, a semiconductor layer provided on the gate insulating film, and a source electrode and a drain electrode that are provided on the semiconductor layer so as to be spaced from each other. Note that the source and drain of a transistor vary with the direction of a current flowing in the transistor. In the present embodiment, the source and the drain are not limited as named.

A gate electrode GL extending in the X direction is provided on the insulating layer 14. The gate electrode GL functions as the scan line GL. A plurality of pixels for one row arranged in the X direction are connected in common to one scan line GL. A gate insulating film (also called an insulating layer) 16 is provided on the insulating layer 14 and the gate electrode GL.

On the gate insulating film 16, a semiconductor layer 17 is provided for each pixel. For example, amorphous silicon is used as the semiconductor layer 17. The structure of the semiconductor layer 17 may be an etching stopper type structure, or may be a channel etch type structure. In the etching stopper type structure, a protection film (for example, a silicon oxide film) is formed on a semiconductor layer, and the semiconductor layer is processed by using this protection film as an etching stopper. In the channel etch type structure, the etching stopper is not formed, and the semiconductor layer is processed when processing a source electrode and a drain electrode.

On the semiconductor layer 17 and the gate insulating film 16, a source electrode 18 and a drain electrode 19 are provided so as to be spaced from each other in the Y direction. The source electrode 18 and the drain electrode 19 partially overlap the semiconductor layer 17. Note that, for good electrical connection between the source electrode 18 and the semiconductor layer 17, an n+-type semiconductor layer into which high-concentration n-type impurities are doped may be provided between them. Similarly, an n+-type semiconductor layer may be provided between the drain electrode 19 and the semiconductor layer 17.

A pixel electrode 20 extending in the Y' direction is provided on the gate insulating film 16. The planar shape of the pixel electrode 20 is, for example, a parallelogram. The pixel electrode 20 is electrically connected to the drain electrode 19. In a configuration example of FIG. 2, the pixel electrode 20 includes a protrusion protruding toward the drain electrode 19.

Signal lines SL extending in the Y direction are provided on the gate insulating film 16. For example, portions of the signal lines SL, which are adjacent to the pixel electrode 20, extend in the Y' direction. The signal line SL is arranged at a boundary portion between two pixels that are adjacent in the X direction. A plurality of pixels for one column arranged in the Y direction are connected in common to one signal line SL. The source electrode 18 is electrically connected to the signal line SL.

An insulating layer 21 is provided on the source electrode 18, the drain electrode 19, the pixel electrode 20, the signal lines SL, and the gate insulating film 16.

The second light shielding layer 22 is provided on the insulating layer 21. The second light shielding layer 22 has a function of shielding the semiconductor layer included in the switching element. The second light shielding layer 22 extends in the X direction. The second light shielding layer 22 is provided in common for a plurality of pixels for one row arranged in the X direction.

The common electrode 23 is provided on the second light shielding layer 22 and the insulating layer 21. The common electrode 23 is electrically connected to the second light shielding layer 22. The common electrode 23 is provided in common for a plurality of pixels. The common electrode 23 includes a plurality of slits 24 for each pixel. FIG. 2 shows the configuration example in which two slits 24 are provided for each pixel. The number of the slits 24 may be one, or may be two or more. The two slits 24 are arranged above the pixel electrode 20, and are arranged in an area occupied by the pixel electrode 20. Similar to the pixel electrode 20, the slits 24 extend in the Y' direction. The planar shape of the slit 24 is, for example, a parallelogram.

An alignment film (not shown) to control the alignment of the liquid crystal layer 12 is provided on the common electrode 23 and the insulating layer 21. The alignment film aligns the liquid crystal molecules horizontally in the initial state (the state where a voltage is not applied) of the liquid crystal layer 12. Additionally, the alignment film is rubbed such that the major axes of the liquid crystal molecules are aligned in the Y direction.

Next, the configuration of the CF substrate 11 side will be described. A black matrix 25 for light shielding (also called a black mask or a light shielding layer) is provided on the liquid crystal layer 12 side of the CF substrate 11. The black matrix 25 is arranged at a boundary portion between pixels, and formed into a mesh. The black matrix 25 has a function of shielding the TFT 15 from light, and a function of blocking unnecessary light between color filters of different colors to improve contrast. As the black matrix 25, for example, a photosensitive resin including black pigment or the like is used.

A plurality of color filters 26 are provided on the CF substrate 11 and the black matrix 25. The color filters (color members) 26 include a plurality of red filters, a plurality of green filters, and a plurality of blue filters. A general color filter is composed of three primary colors of light: red (R); green (G); and blue (B). A set of adjacent three colors of R, G, and B is a display unit (pixel), and a monochromatic part of any of R, G, and B in one pixel is a minimum driving unit called a sub-pixel. The TFT 15 and the pixel electrode 20 are provided for each sub-pixel. In the descriptions of the present specification, the sub-pixel will be referred to as a pixel, unless it is particularly necessary to distinguish between a pixel and a sub-pixel. As the array of the color filters, an arbitrary array including a stripe array, a mosaic array, and a delta array can be applied. Note that, in the plan view of FIG. 2, the illustration of the color filter 26 and the black matrix 25 is omitted.

An alignment film (not shown) to control the alignment of the liquid crystal layer 12 is provided on the color filter 26. The alignment film horizontally aligns liquid crystal molecules in the initial state of the liquid crystal layer 12. Additionally, the alignment film is rubbed such that the major axes of the liquid crystal molecules are aligned in the Y direction.

Although the illustration is omitted, a first polarizing plate is stacked on the TFT substrate 10 opposite to the liquid crystal layer 12, and a second polarizing plate is stacked on the CF substrate 11 opposite to the liquid crystal layer 12. The first polarizing plate and the second polarizing plate are arranged such that, for example, respective transmission axes are orthogonal to each other, that is, in a crossed Nicols state.

(Examples of Materials)

As the gate electrode GL, the source electrode 18, the drain electrode 19, and the signal lines SL, for example, any of aluminum (Al), molybdenum (Mo), chromium (Cr), and tungsten (W), or an alloy containing one or more of these is used.

The pixel electrode 20 and the common electrode 23 are formed of a transparent electrode, and for example, ITO (indium tin oxide) is used.

As the first light shielding layer 13 and the second light shielding layer 22, for example, chromium (Cr), molybdenum (Mo), aluminum (Al), silver (Ag) or the like is used.

As the insulating layer 14, the gate insulating film 16, and the insulating layer 21, a transparent insulating material is used, and for example, a silicon nitride (SiN) is used.

[1-3] Alignment of Liquid Crystal Layer 12

Next, the alignment of the liquid crystal layer 12 will be described.

A common voltage Vcom is applied to the common electrode 23 by the common electrode driver 6. The common voltage Vcom is, for example, 0V. In an off state, no electric field is applied to the liquid crystal layer 12, and the same common voltage Vcom as that of the common electrode 23 is applied to the pixel electrode 20. In an on state, an electric field is applied to the liquid crystal layer 12, and a positive voltage is applied to the pixel electrode 20. Note that, actually, reverse driving (AC driving) is performed to reverse the polarity of an electric field between the pixel electrode 20 and the common electrode 23 at a predetermined period. By performing the reverse driving, liquid crystal can be suppressed from being degraded. The period of the reverse driving can be set arbitrarily.

In the off state, the liquid crystal molecules are set in the initial state, that is, the major axes of the liquid crystal molecules are aligned in the Y direction. The Y direction is the same as the rubbing direction of the alignment film.

In the on state, an electric field, which is directed from the common electrode 23 to the pixel electrode 20, is applied to the liquid crystal layer 12. In a planar view, the liquid crystal molecules rotate in an oblique direction with respect to the Y direction. Accordingly, the liquid crystal display panel 2 can control the amount of transmission of incident light. That is, the transmittance of the liquid crystal display panel 2 can be changed.

[1-4] Conditions on Size of Stacked Structure

Next, the conditions on the size of the stacked structure composing the liquid crystal display panel 2 will be described. FIG. 7 is a plan view of a part of a pixel, showing the semiconductor layer 17 in the center. FIG. 8 is a cross-sectional view of a part of a pixel taken along line C-C' of FIG. 7.

The length of the first light shielding layer 13 in the Y direction is longer than the length of the gate electrode GL in the Y direction. Additionally, in the Y direction, one end of the gate electrode GL is arranged at an inner side of one end of the first light shielding layer 13. In the Y direction, the other end of the gate electrode GL is arranged at an inner side of the other end of the first light shielding layer 13.

The length of the gate electrode GL in the Y direction is longer than the length of the semiconductor layer 17 in the Y direction. Additionally, in the Y direction, one end of the semiconductor layer 17 is arranged at an inner side of the end of the gate electrode GL. In the Y direction, the other end of the semiconductor layer 17 is arranged at an inner side of the other end of the gate electrode GL.

The length of the semiconductor layer 17 in the Y direction is shorter than the length of the first light shielding layer 13 in the Y direction. Additionally, in the Y direction, the one end of the semiconductor layer 17 is arranged at an inner side of the end of the first light shielding layer 13. In the Y direction, the other end of the semiconductor layer 17 is arranged at an inner side of the other end of the first light shielding layer 13. In the Y direction, let each of the distance between the one end of the semiconductor layer 17 and the one end of the first light shielding layer 13, and the distance between the other end of the semiconductor layer 17 and the other end of the first light shielding layer 13 be "a". The distance "a" is 3 µm or more and 6 µm or less. The backlight 3 is arranged at the substrate 10 side of the liquid crystal display panel 2, and emits illumination light toward the substrate 10. The first light shielding layer 13 satisfying the above-described conditions can suppress that the light from the backlight 3 is incident on the semiconductor layer 17.

The length of the semiconductor layer 17 in the Y direction is equal to or less than the length of the second light shielding layer 22 in the Y direction. Additionally, in the Y direction, the one end of the semiconductor layer 17 is arranged at the same position as one end of the second light shielding layer 22, or an inner side of the one end of the second light shielding layer 22. In the Y direction, the other end of the semiconductor layer 17 is arranged at the same position as the other end of the second light shielding layer 22, or at an inner side of the other end of the second light shielding layer 22. In the Y direction, let each of the distance between the one end of the semiconductor layer 17 and the one end of the second light shielding layer 22, and the distance between the other end of the semiconductor layer 17 and the other end of the second light shielding layer 22 be "b". The distance "b" is 0 μm or more and 3 μm or less. External light may be incident on the liquid crystal display panel 2 from the substrate 11 side of the liquid crystal display panel 2. The second light shielding layer 22 can suppress that the external light incident on the liquid crystal display panel 2 is incident on the semiconductor layer 17.

In a planar view, the common electrode 23 is arranged so as to cover the gate electrode GL. The planar view refers to a state where the pixel is viewed from above with respect to the substrate. That is, in the Y direction, the one end of the gate electrode GL is arranged at the same position as one end of the slit 24 included in a first pixel, or away from the one end of the slit 24. In the Y direction, the other end of the gate electrode GL is arranged at the same position as one end of the slit 24 included in a second pixel that is adjacent to the first pixel in the Y direction, or away from the one end of the slit 24. In the Y direction, let each of the distance between the one end of the gate electrode GL and the one end of the slit 24 included in the first pixel, and the distance between the other end of the gate electrode GL and the one end of the slit 24 included in the second pixel be "c". The distance "c" is 0 μm or more and 4 μm or less.

In the present embodiment, the gate electrode GL can be covered with the common electrode 23. Accordingly, it is possible to suppress that the potential applied to the gate electrode GL is applied to the liquid crystal layer 12. Thus, it is possible to suppress that the alignment of the liquid crystal layer 12 is disturbed by the potential of the gate electrode GL.

In a planar view, the pixel electrode 20 is arranged so as not to overlap with the gate electrode GL. That is, in the Y direction, the one end of the gate electrode GL is arranged at the same position as the one end of the pixel electrode 20 included in the first pixel, or away from the one end of the pixel electrode 20. Note that the one end of the pixel electrode 20 is the end shown in the cross-sectional view of FIG. 8, and the protrusion of the pixel electrode 20 on the drain electrode 19 is not taken into consideration. In the Y direction, the other end of the gate electrode GL is arranged at the same position as the one end of the pixel electrode 20 included in the second pixel that is adjacent to the first pixel in the Y direction, or away from the one end of the pixel electrode 20. In the Y direction, let each of the distance between the one end of the gate electrode GL and the one end of the pixel electrode 20 included in the first pixel, and the distance between the other end of the gate electrode GL and the one end of the pixel electrode 20 included in the second pixel be "c". The conditions of the distance "c" are the same as those of the aforementioned distance "c."

In the present embodiment, the pixel electrode 20 and the gate electrode GL can be configured so as not to overlap with each other. Accordingly, the parasitic capacity between the pixel electrode 20 and the gate electrode GL can be reduced. Thus, the operating characteristics of the liquid crystal display panel 2 can be improved.

The black matrix 25 is arranged above the second light shielding layer 22. In the Y direction, the length of the black matrix 25 is shorter than the length of the second light shielding layer 22. Additionally, in the Y direction, one end of the black matrix 25 is arranged at an inner side the one end of the second light shielding layer 22. In the Y direction, the other end of the black matrix 25 is arranged at an inner side the other end of the second light shielding layer 22. The black matrix 25 can suppress that external light incident from the substrate 11 is incident on the semiconductor layer 17.

[1-5] Potential Control of First Light Shielding Layer 13

Figure 9:
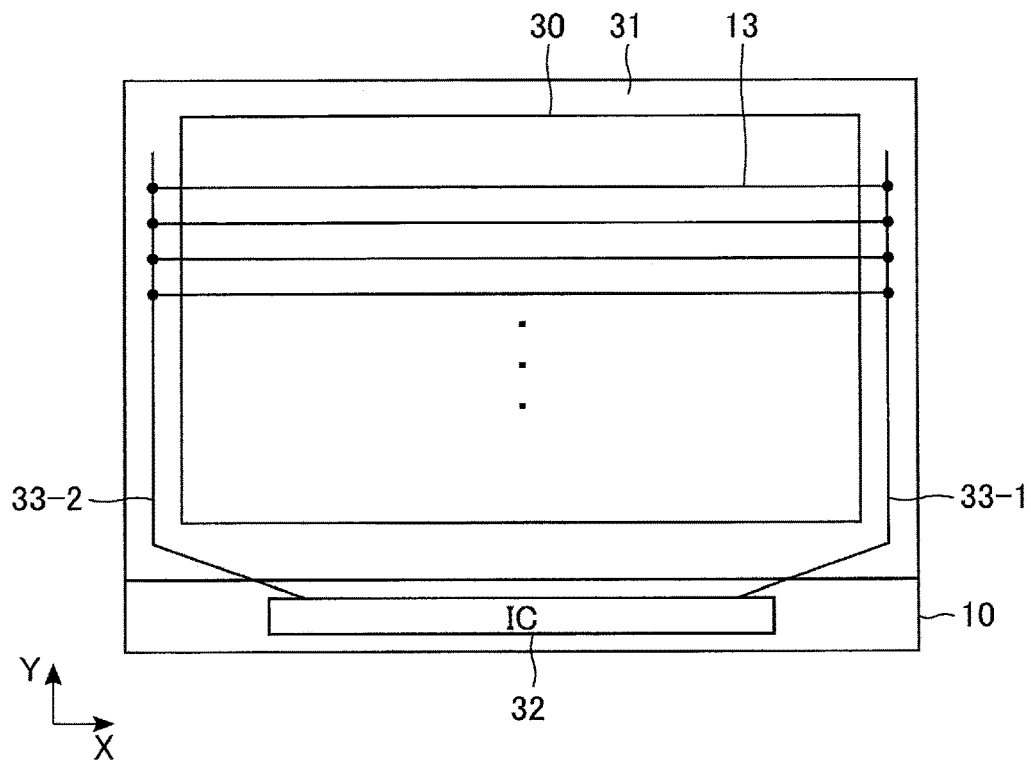
FIG. 9 is a schematic plan view of the liquid crystal display panel for describing the potential control of first light shielding layers.

Next, the potential control of the first light shielding layer 13 will be described. FIG. 9 is a schematic plan view of the liquid crystal display panel 2 for describing the potential control of the first light shielding layer 13.

The liquid crystal display panel 2 includes a display area (view area) 30, a bezel 31, an integrated circuit (IC) 32, and power supply lines 33-1 and 33-2.

The display area 30 is an area of the liquid crystal display panel 2 where an image is displayed. The bezel 31 is a peripheral area surrounding the display area 30. The bezel 31 is the area where the signal lines, the power supply lines, and the like are provided, is shielded from light by a black light shielding layer, and is visually recognized as black from a user.

The power supply lines 33-1 and 33-2 are provided in the bezel 31. The power supply lines 33-1 and 33-2 are arranged at the both sides of the display area 30, respectively. The power supply lines 33-1 and 33-2 are electrically connected to the integrated circuit 32. The common voltage Vcom is applied to the power supply lines 33-1 and 33-2.

The integrated circuit 32 is provided on the substrate 10. The integrated circuit 32 includes the scan line driving circuit 4, the signal line driving circuit 5, the common electrode driver 6, the voltage generation circuit 7, and the control circuit 8, which are described above. The integrated circuit 32 supplies the common voltage Vcom to the power supply lines 33-1 and 33-2.

A plurality of first light shielding layers 13, each extending in the X direction, are disposed in the display area 30. The first light shielding layers 13 are electrically connected to the power supply lines 33-1 and 33-2, and the common voltage Vcom is applied to the first light shielding layers 13.

According to the present example, the first light shielding layers 13 can be fixed to the common voltage Vcom. Thus, it is possible to suppress that the potential of the first light shielding layers 13 disturbs the alignment of the liquid crystal layer 12.

Figure 10:
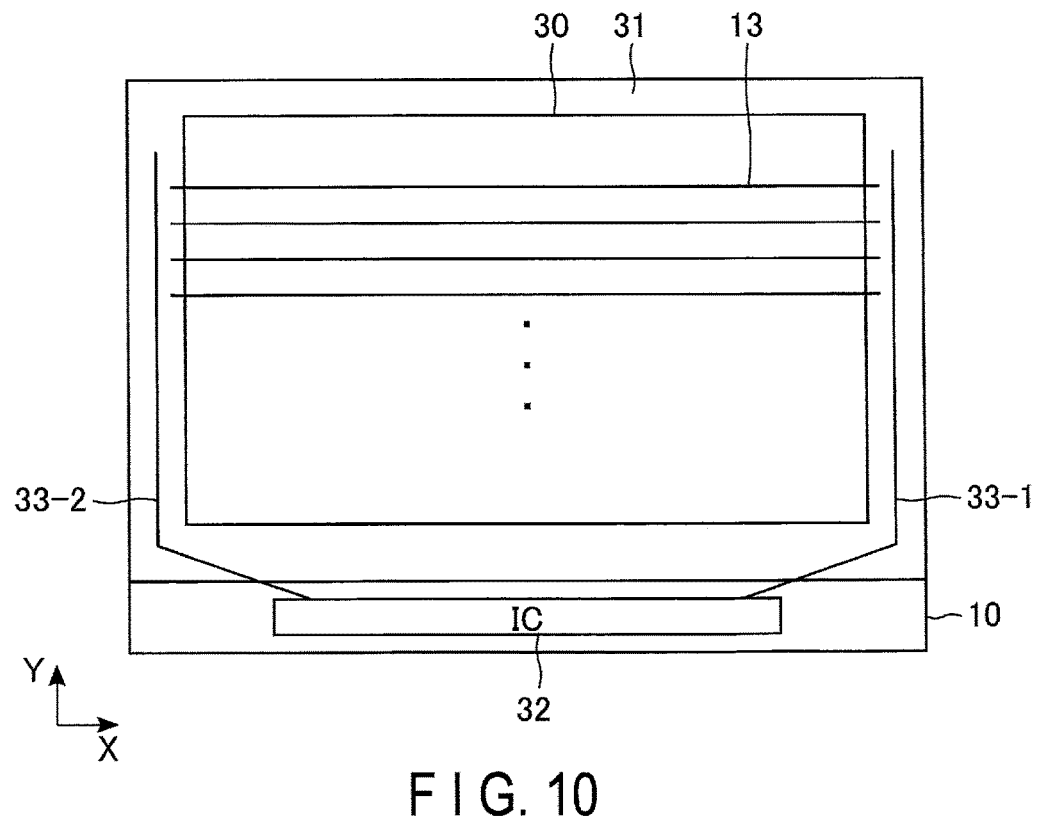
FIG. 10 is a schematic plan view of a liquid crystal display panel for describing the potential control of first light shielding layers according to another example.

FIG. 10 is a schematic plan view of a liquid crystal display panel 2 for describing the potential control of first light shielding layers 13 according to another example.

A plurality of first light shielding layers 13 are not connected to power supply lines 33-1 and 33-2, and are made floating. By making the first light shielding layers 13 floating, the capacity coupling between the first light shielding layers 13 can be reduced. Thus, the operating characteristics of the liquid crystal display panel 2 can be improved.

Additionally, as described above, a second light shielding layer 22 is electrically connected to a common electrode 23, and a common voltage Vcom is applied to the second light shielding layer 22. Thus, it is possible to prevent that the alignment of the liquid crystal layer 12 is disturbed due to the second light shielding layer 22.

[1-6] Advantageous Effects of First Embodiment

As described in detail above, according to the first embodiment, a liquid crystal display device that can improve operating characteristics can be provided. Specific advantageous effects will be described below.

The first light shielding layer 13 is provided under the gate electrode GL. The semiconductor layer 17 included in the switching element 15 is provided above the gate electrode GL. The length of the first light shielding layer 13 in the Y direction is longer than the length of the gate electrode GL in the Y direction. The length of the gate electrode GL in the Y direction is longer than the length of the semiconductor layer 17 in the Y direction. Accordingly, it is possible to suppress that the illumination light from the backlight 3 emitted to the substrate 10 is incident on the semiconductor layer 17. Thus, the leakage current of the switching element 15 can be reduced.

Additionally, since the first light shielding layer 13 bears the function of shielding the semiconductor layer 17 from light, the length of the gate electrode GL in the Y direction can be reduced. For the amount that the gate electrode GL is made short, the pixel electrode 20 can be made closer to the gate electrode GL. Accordingly, the aperture ratio of a pixel can be improved, and consequently, the transmittance of the pixel can be improved.

Additionally, the second light shielding layer 22 is provided above the semiconductor layer 17. The length of the second light shielding layer 22 in the Y direction is equal to or greater than the length of the semiconductor layer 17 in the Y direction. Accordingly, it is possible to suppress that the external light incident from the substrate 11 side is incident on the semiconductor layer 17. Thus, the leakage current of the switching element 15 can be reduced.

Additionally, the common electrode 23 is arranged so as to cover the gate electrode GL. Accordingly, it is possible to suppress that the potential applied to the gate electrode GL is applied to the liquid crystal layer 12. Thus, it is possible to suppress that the alignment of the liquid crystal layer 12 is disturbed by the potential of the gate electrode GL.

Additionally, the pixel electrode 20 is arranged so as not to overlap with the gate electrode GL. Accordingly, the parasitic capacity between the pixel electrode 20 and the gate electrode GL can be reduced. Thus, the operating characteristics of the liquid crystal display panel 2 can be improved.

[2] Second Embodiment

In a second embodiment, the first light shielding layer 13 shown in the first embodiment is divided into two first light shielding layers 13-1 and 13-2, and the semiconductor layer 17 is shielded from light by the first light shielding layers 13-1 and 13-2 and a gate electrode GL.

Figure 11:
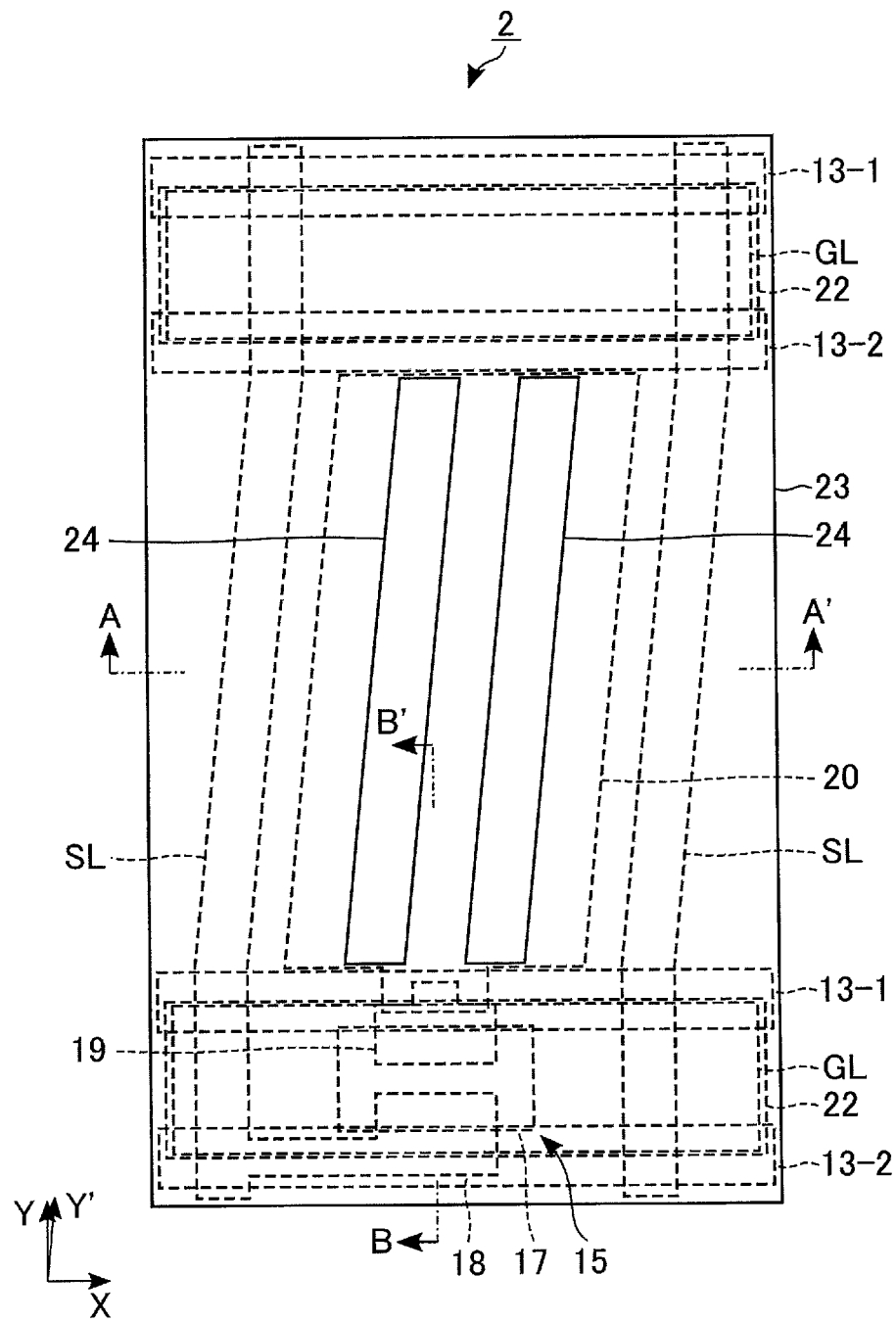
FIG. 11 is a plan view of a liquid crystal display panel according to a second embodiment.
Figure 12:
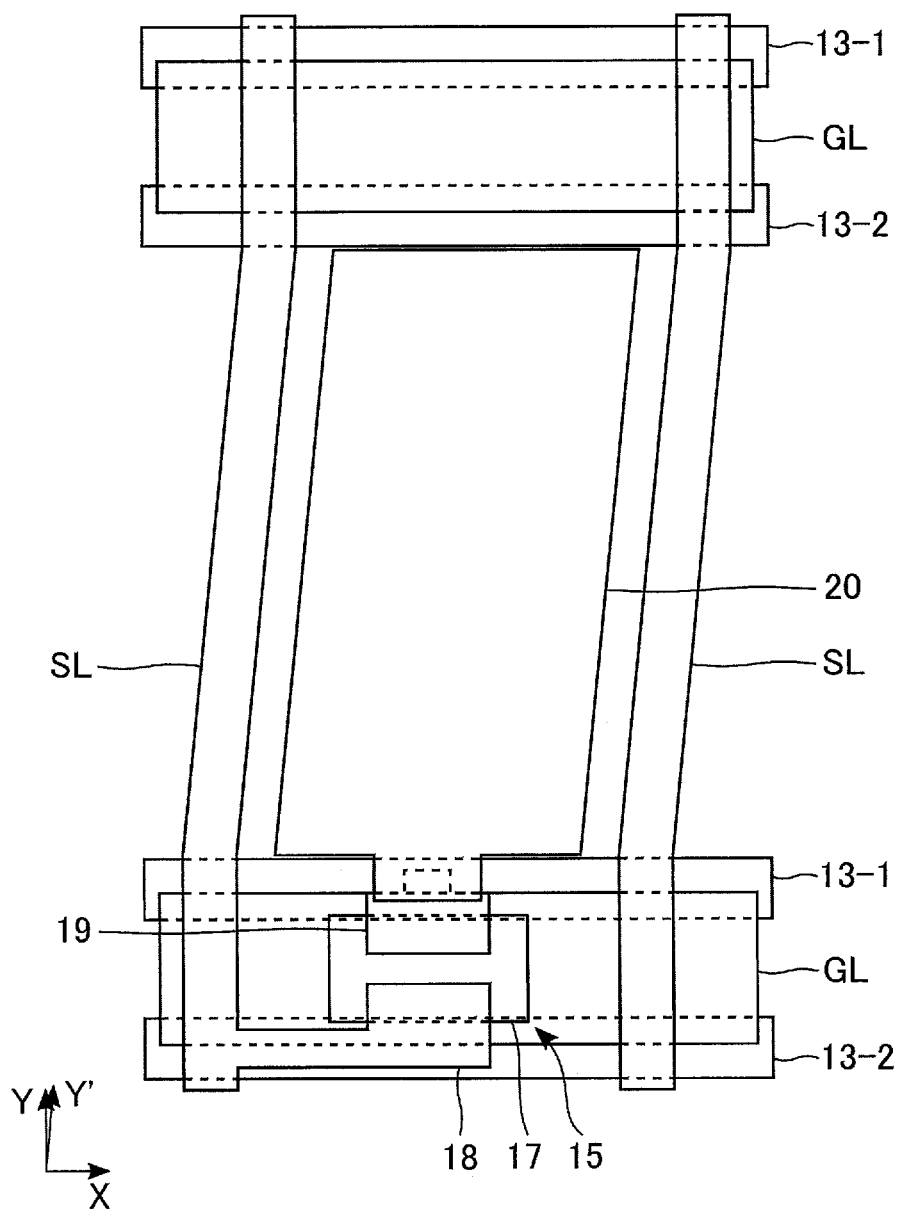
FIG. 12 is a plan view for describing the configuration of liquid crystal display panel below a second light shielding layer and a common electrode.

FIG. 11 is a plan view of a liquid crystal display panel 2 according to the second embodiment. FIG. 12 is a plan view for describing the configuration of the liquid crystal display panel 2 below a second light shielding layer 22 and a common electrode 23. FIG. 13 is a cross-sectional view of the liquid crystal display panel 2 taken along line B-B' of FIG. 11. A plan view that extracts the second light shielding layer 22 and the common electrode 23 is the same as FIG. 4. A cross-sectional view of the liquid crystal display panel 2 taken along A-A' line of FIG. 11 is the same as FIG. 5.

The two first light shielding layers 13-1 and 13-2 are provided on a liquid crystal layer 12 side of a TFT substrate 10. The first light shielding layers 13-1 and 13-2 have a function of shielding a semiconductor layer included in a switching element from light. Each of the first light shielding layers 13-1 and 13-2 extends in an X direction. For example, the first light shielding layers 13-1 and 13-2 are provided in common for a plurality of pixels for one row arranged in the X direction.

In a Y direction, the first light shielding layer 13-1 is arranged so as to overlap with one end of the gate electrode GL. In the Y direction, the first light shielding layer 13-2 is arranged so as to overlap with the other end of the gate electrode GL.

In the Y direction, the conditions of a distance "a" between one end of the first light shielding layer 13-1 and one end of the semiconductor layer 17 are the same as those in the first embodiment. In the Y direction, the conditions of the distance "a" between one end of the first light shielding layer 13-2 and the other end of the semiconductor layer 17 are the same as those in the first embodiment.

Additionally, the conditions of the distance "b" and the distance "c" shown in the first embodiment are also applied to the second embodiment. Similar to the first embodiment, the first light shielding layers 13-1 and 13-2 may be fixed to a common voltage Vcom, or may be made floating.

According to the second embodiment, the area of the first light shielding layer 13 formed by the first light shielding layers 13-1 and 13-2 can be made small. Additionally, the area where the first light shielding layer 13 and the gate electrode GL overlap with each other can be made small. Accordingly, the parasitic capacity between the first light shielding layer 13 and the gate electrode GL can be reduced. Thus, the operating characteristics of the liquid crystal display panel 2 can be improved.

[3] Third Embodiment

A third embodiment is a modification of the first embodiment, and divides a first light shielding layer 13 for each pixel.

FIG. 14 is a plan view of a liquid crystal display panel 2 according to the third embodiment. FIG. 15 is a plan view for describing the configuration of the liquid crystal display panel 2 below a second light shielding layer 22 and a common electrode 23. A plan view that extracts the second light shielding layer 22 and the common electrode 23 is the same as FIG. 4. A cross-sectional view of the liquid crystal display panel 2 taken along A-A' line of FIG. 14 is the same as FIG. 5. A cross-sectional view of the liquid crystal display panel 2 taken along B-B' line of FIG. 14 is the same as FIG. 6.

The liquid crystal display panel 2 includes a plurality of first light shielding layers 13 provided for each pixel. Each first light shielding layer 13 is arranged below a corresponding semiconductor layer 17. The first light shielding layers 13 extend in an X direction. The length of the first light shielding layers 13 in the X direction is longer than the length of the semiconductor layer 17 in the X direction. In the present embodiment, the first light shielding layers 13 extend over two source lines SL that partition the X direction of a pixel. Two first light shielding layers 13 that are adjacent to each other in the X direction are electrically separated below the source line SL. The first light shielding layers 13 are made floating.

According to the third embodiment, the parasitic capacity between the first light shielding layers 13 and the gate electrode GL can be reduced. Thus, the operating characteristics of the liquid crystal display panel 2 can be improved.

[4] Fourth Embodiment

A fourth embodiment is a modification of the second embodiment, and divides the first light shielding layers 13-1 and 13-2 for each pixel.

Figure 16:
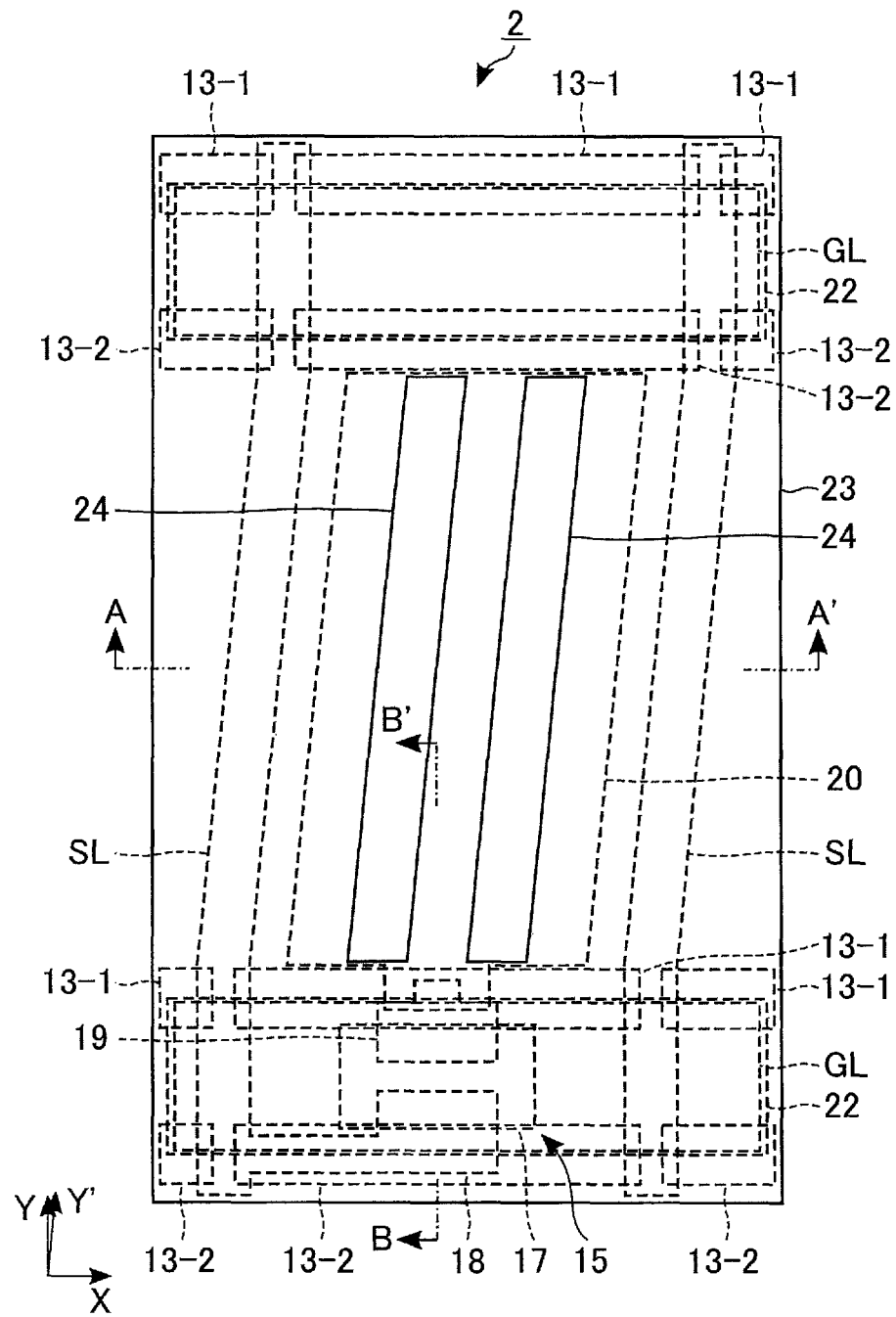
FIG. 16 is a plan view of a liquid crystal display panel according to a fourth embodiment.
Figure 17:
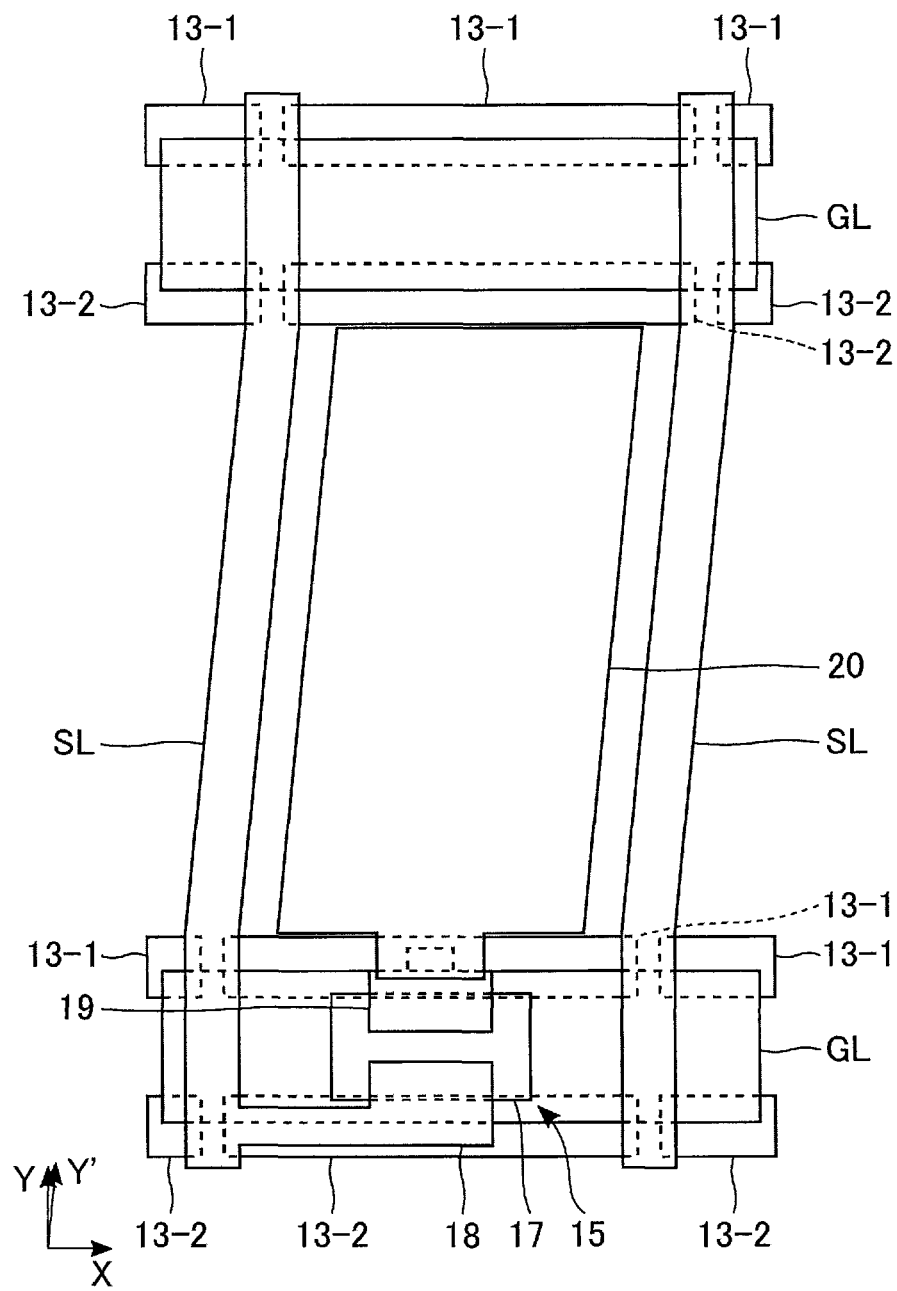
FIG. 17 is a plan view for describing the configuration of the liquid crystal display panel below a second light shielding layer and a common electrode.

FIG. 16 is a plan view of a liquid crystal display panel 2 according to the fourth embodiment. FIG. 17 is a plan view for describing the configuration of the liquid crystal display panel 2 below a second light shielding layer 22 and a common electrode 23. A plan view that extracts the second light shielding layer 22 and the common electrode 23 is the same as FIG. 4. A cross-sectional view of the liquid crystal display panel 2 taken along A-A' line of FIG. 16 is the same as FIG. 5. A cross-sectional view of the liquid crystal display panel 2 taken along B-B' line of FIG. 16 is the same as FIG. 13.

The liquid crystal display panel 2 includes a plurality of first light shielding layers 13-1 and a plurality of first light shielding layers 13-2 provided for each pixel. Each first light shielding layer 13-1 and each first light shielding layer 13-2 are arranged below a corresponding semiconductor layer 17. The first light shielding layers 13-1 and 13-2 extend in an X direction. The length of each of the first light shielding layers 13-1 and 13-2 in the X direction is longer than the length of the semiconductor layer 17 in the X direction. In the present embodiment, the first light shielding layer 13-1 extends over two source lines SL that partition the X direction of a pixel. Two first light shielding layers 13-1 that are adjacent to each other in the X direction are electrically separated below the source line SL. The first light shielding layer 13-2 extends over the two source lines SL that partition the X direction of the pixel. Two first light shielding layers 13-2 that are adjacent to each other in the X direction are electrically separated below the source line SL. The first light shielding layers 13-1 and 13-2 are made floating.

According to the fourth embodiment, the parasitic capacity between the first light shielding layers 13-1 and the gate electrode GL can be reduced. Additionally, the parasitic capacity between the first light shielding layers 13-2 and the gate electrode GL can be reduced. Thus, the operating characteristics of the liquid crystal display panel 2 can be improved.

In each of the above-described embodiments, the pixel electrode 20 and the slits 24 are configured to extend in an oblique direction (the Y' direction) inclined with respect to the Y direction. However, the pixel electrode 20 and the slits 24 are not limited to this configuration, and may be configured to extend in the Y direction.

The present invention is not limited to the foregoing embodiments. When the invention is reduced to practice, a variety of modifications can be made without departing from the spirit of the invention. The embodiments can be combined as appropriate, and advantageous effects can be obtained from the combination. Furthermore, the foregoing embodiments include a variety of inventions, and a variety of inventions can be extracted by selecting and combining a plurality of structural elements. For example, even though some of the structural elements are deleted from the embodiments, a configuration from which the structural elements are deleted can be extracted as an invention if the problem can be solved and an advantageous effect can be obtained.

The invention claimed is:

1. A liquid crystal display device comprising:
   a first substrate and a second substrate;
   a liquid crystal layer sandwiched between the first substrate and the second substrate;
   a first light shielding layer that is provided on the first substrate, and extends in a first direction;
   a first insulating layer provided on the first light shielding layer;
   a gate electrode that is provided on the first insulating layer and above the first light shielding layer, and extends in the first direction;
   a second insulating layer provided on the gate electrode;
   a semiconductor layer that is provided on the second insulating layer and above the gate electrode, and is provided for each pixel;
   a source electrode and a drain electrode that are provided apart from each other in a second direction that intersects the first direction, so as to partially overlap with the semiconductor layer;
   a pixel electrode that is provided on the second insulating layer, electrically connected to the drain electrode, and extends in the second direction;
   a third insulating layer provided on the semiconductor layer and the pixel electrode;
   a second light shielding layer that is provided on the third insulating layer and above the semiconductor layer, and extends in the first direction; and
   a common electrode that is provided on the third insulating layer and the second light shielding layer, is electrically connected to the second light shielding layer, and includes a slit that extends in the second direction.

2. The liquid crystal display device according to claim 1, wherein, in the second direction, a length of the first light shielding layer is longer than a length of the gate electrode.

3. The liquid crystal display device according to claim 1, wherein, in the second direction, a length of the gate electrode is longer than a length of the semiconductor layer.

4. The liquid crystal display device according to claim 1, comprising:
   a first pixel and a second pixel that are adjacent to each other in the first direction,
   wherein the first light shielding layer is divided by the first pixel and the second pixel.

5. The liquid crystal display device according to claim 1, wherein, in the second direction, a length of the second light shielding layer is equal to or greater than a length of the semiconductor layer.

6. The liquid crystal display device according to claim 1, wherein the common electrode is arranged so as to cover the gate electrode.

7. The liquid crystal display device according to claim 1, wherein the pixel electrode is arranged so as not to overlap with the gate electrode.

8. The liquid crystal display device according to claim 1, wherein same voltage as a common voltage applied to the common electrode is applied to the first light shielding layer.

9. The liquid crystal display device according to claim 1, wherein the first light shielding layer is made floating.

10. The liquid crystal display device according to claim 1, further comprising:
    a third light shielding layer that is provided on the second substrate, and is provided above the semiconductor layer, wherein, in the second direction, a length of the third light shielding layer is shorter than a length of the second light shielding layer.

11. The liquid crystal display device according to claim 1, wherein the first light shielding layer is formed by a first portion and a second portion that each extend in the first direction, and are adjacent to each other in the second direction, and in the second direction, the first portion is arranged so as to overlap with one end of the gate electrode, and the second portion is arranged so as to overlap with an other end of the gate electrode.

* * * * *